(12) United States Patent
Iwaki et al.

(10) Patent No.: US 9,920,390 B2
(45) Date of Patent: Mar. 20, 2018

(54) METHOD FOR PRELIMINARY TREATMENT OF MOLTEN IRON

(71) Applicant: JFE STEEL CORPORATION, Tokyo (JP)

(72) Inventors: Yozo Iwaki, Fukuyama (JP); Shizuhiko Ikeno, Fukuyama (JP); Kochiro Ejima, Fuuyama (JP); Takeshi Ishii, Tokyo (JP); Masanori Nishikori, Fukuyama (JP); Hironori Fukushima, Fukuyama (JP); Naoki Kikuchi, Fukuyama (JP); Norihiko Suzuki, Fukuyama (JP); Kotaro Tanaka, Kawasaki (JP); Kazuhito Yamamoto, Yokohama (JP); Ryo Kawabata, Tokyo (JP); Naotaka Sasaki, Chiba (JP); Yasushi Ogasawara, Chiba (JP); Futoshi Ogasawara, Chiba (JP); Yuichi Uchida, Chiba (JP); Masaomi Senoo, Fukuyama (JP); Manabu Tano, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 324 days.

(21) Appl. No.: 14/371,359

(22) PCT Filed: Jan. 17, 2013

(86) PCT No.: PCT/JP2013/050742
§ 371 (c)(1),
(2) Date: Jul. 9, 2014

(87) PCT Pub. No.: WO2013/108810
PCT Pub. Date: Jul. 25, 2013

(65) Prior Publication Data
US 2015/0000470 A1 Jan. 1, 2015

(30) Foreign Application Priority Data

Jan. 19, 2012 (JP) ................................. 2012-008811
Jan. 16, 2013 (JP) ................................. 2013-005194

(51) Int. Cl.
*C21C 1/02* (2006.01)
*C21C 1/04* (2006.01)
(Continued)

(52) U.S. Cl.
CPC ............. *C21C 1/02* (2013.01); *C21C 1/025* (2013.01); *C21C 1/04* (2013.01); *C21C 5/35* (2013.01);
(Continued)

(58) Field of Classification Search
CPC ...................................................... C21C 1/02
See application file for complete search history.

(56) References Cited

U.S. PATENT DOCUMENTS

| 5,868,817 A | 2/1999 | Yano et al. | |
|---|---|---|---|
| 2004/0076539 A1* | 4/2004 | Ito | B22F 9/06 420/13 |
| 2011/0265603 A1* | 11/2011 | Sugiyama | C21B 13/0046 75/331 |

FOREIGN PATENT DOCUMENTS

| CN | 1470653 A | 1/2004 |
|---|---|---|
| CN | 1590564 A | 3/2005 |

(Continued)

OTHER PUBLICATIONS

Chinese Office Action issued in Chinese Patent Application No. 201280034966.6 dated Sep. 2, 2014 (with partial translation).
(Continued)

*Primary Examiner* — Jenny R Wu
(74) *Attorney, Agent, or Firm* — Oliff PLC (57) ABSTRACT

There is proposed a method for preliminary treatment of molten iron wherein heat source for dissolving scrap is
(Continued)

ensured sufficiently to improve iron yield while decreasing phosphorus concentration efficiently by suppressing the amount of flux solvent used in the process of desiliconization, dephosphorization and decarburization. In the method for preliminary treatment of molten iron by conducting desiliconization and dephosphorization of molten iron with a converter type container, molten iron is first charged into the converter type container to conduct desiliconization and then intermediate slag removal is conducted, and subsequently a lime-based flux solvent is added to the container while blowing oxygen to conduct dephosphorization of the molten iron, and thereafter newly untreated molten iron is charged into the container to conduct desiliconization, and subsequently the above treatments are repeatedly conducted with the same container.

11 Claims, 4 Drawing Sheets

(51) Int. Cl.
  C21C 5/36 (2006.01)
  C21C 5/35 (2006.01)
  C21C 7/076 (2006.01)
(52) U.S. Cl.
  CPC ............... *C21C 5/36* (2013.01); *C21C 7/076* (2013.01); *C21C 2300/08* (2013.01); *Y02P 10/216* (2015.11); *Y02P 10/242* (2015.11)

(56) References Cited

FOREIGN PATENT DOCUMENTS

| JP | A-8-260022 | 10/1996 |
|---|---|---|
| JP | A-9-176717 | 7/1997 |
| JP | A-10-152714 | 6/1998 |
| JP | A-10-265820 | 10/1998 |
| JP | 2000-178627 A | 6/2000 |
| JP | 2000-290716 A | 10/2000 |
| JP | 2001271113 A * | 10/2001 |
| JP | A-2001-271113 | 10/2001 |
| JP | A-2002-47509 | 2/2002 |
| JP | A-2002-129221 | 5/2002 |
| JP | A-2002-241829 | 8/2002 |
| JP | A-2002-256325 | 9/2002 |
| JP | 2002290716 A * | 10/2002 |
| JP | 2004190101 A * | 7/2004 |
| JP | A-2004-190101 | 7/2004 |
| JP | 2010077522 A * | 4/2010 |
| JP | A-2010-77522 | 4/2010 |
| JP | A-2011-137196 | 7/2011 |
| JP | A-2011-149083 | 8/2011 |
| KR | 20020000701 A * | 1/2002 |

OTHER PUBLICATIONS

May 17, 2015 Office Action issued in Korean Patent Application No. 10-2013-7034480.
Mar. 26, 2015 Office Action issued in Chinese Patent Application No. 201380005806.3.
Okamura, S. et al., "Improvement of the Heat Balance in Combined Blowing Process of the LD Converter," *The Iron and Steel Institute of Japan (ISIJ)*, 1985, pp. 1787-1794, vol. 71, No. 15 (with Abstract).
International Preliminary Report on Patentability issued in International Application No. PCT/JP2012/068349 dated Jan. 21, 2014 (with translation).
Written Opinion of the International Searching Authority issued in International Application No. PCT/JP2013/050742 dated Apr. 2, 2013 (with translation).
International Preliminary Report on Patentability issued in International Application No. PCT/JP2013/050742 dated Jul. 22, 2014 (with translation).
Apr. 2, 2013 International Search Report issued in International Application No. PCT/JP2013/050742.
Oct. 16, 2012 Written Opinion of the International Searching Authority issued in International Application No, PCT/JP2012/068349.
Aug. 27, 2013 Office Action issued in Japanese Patent Application No. 2013-127076 (with translation).
U.S. Appl. No. 14/115,125, filed Nov. 1, 2013 in the name of Ikeno et al.
Oct. 16, 2012 International Search Report issued in International Application No. PCT/JP2012/068349.
Jun. 15, 2015 Office Action issued in U.S. Appl. No. 14/115,125.
Sep. 25, 2015 Office Action issued in Korean Application KR2014-7019131.
Sep. 19, 2016 Office Action issued in Chinese Patent Application No. 201510487056.9.

* cited by examiner

METHOD FOR PRELIMINARY TREATMENT OF MOLTEN IRON

TECHNICAL FIELD

This invention relates to a method for preliminary treatment of molten iron, and more particularly to a method for conducting both desiliconization and dephosphorization in one (same) converter type container.

BACKGROUND ART

In general, molten iron is subjected to preliminary treatment for preliminarily removing silicon and phosphorus in the molten iron prior to decarburization refining in a converter. The preliminary treatment of the molten iron is carried out for the purpose of decreasing an amount of a refining flux used, enhancing a purity of molten steel, improving a yield of manganese by prevention of peroxidation in an operation with a converter, decreasing an amount of refining slag, and so on, and various methods including a treatment in decarburization step are proposed therefor.

The refining slag is generated in the preliminary treatment of the molten iron. When the refining slag is utilized for various applications, it is required that fluorine and the like are not eluted depending on the application. To this end, there has hitherto been reviewed a method of conducting preliminary treatment of molten iron using no fluorite ($CaF_2$) as a fluorine source used for the purpose of enhancing dephosphorization efficiency. Recently, it is also demanded to reduce volume of greenhouse gas emission in steel industry. In this connection, there is reviewed a refining method wherein usage rate of molten iron from a blast furnace requiring large energy for reduction of iron oxide is decreased while usage rate of cold iron source such as iron scrap or the like is increased. Under such a situation, the recent method for the preliminary treatment of molten iron tends to increase the usage rate of the cold iron source while improving the refining method.

As one of preliminary treatments of molten iron conducting desiliconization or dephosphorization of molten iron, there is a method wherein silicon or phosphorus in the molten iron is removed into a slag by adding a refining agent (flux solvent) such as quicklime or the like to the molten iron while adding a gaseous oxygen or a solid oxygen source such as iron oxide or the like. As a container for the treatment of molten iron are used a transportation container such as torpedo car, blast furnace pan or the like, a converter type container (refining furnace) and so on. In order to use a great amount of scrap, it is advantageous to use a converter type container having a large capacity.

In Patent Document 1 is disclosed a refining method of molten iron conducting desiliconization and dephosphorization with a converter wherein intermediate slag removal is carried out after the desiliconization in the converter and subsequently dephosphorization is conducted. This method proposes a method wherein rephosphorization after the desiliconization is suppressed by controlling the composition of the slag to facilitate subsequent dephosphorization.

In Patent Document 2 is disclosed a method for preliminary treatment of molten iron wherein desiliconization is carried out with a converter type reaction vessel and the desiliconized molten iron after the tapping and slag removal is again returned to the reaction vessel to conduct dephosphorization. This method for preliminary treatment of molten iron is a method of conducting dephosphorization efficiently by properly adjusting silicon concentration, slag basicity and iron oxide concentration in the molten iron after the desiliconization without using fluorite and a method of dissolving scrap in the desiliconization and/or dephosphorization.

In Patent Document 3 is disclosed a preliminary treatment method continuously conducting desiliconization and dephosphorization of molten iron with a converter type container wherein 40~60 mass % of a slag generated after the dephosphorization of a precedent charge is retained in the container and utilized in the desiliconization and dephosphorization to decrease the amount of slag generated.

PRIOR ART DOCUMENTS

Patent Documents

Patent Document 1: JP-A-2001-271113
Patent Document 2: JP-A-2002-129221
Patent Document 3: JP-A-2002-256325

SUMMARY OF THE INVENTION

Task to be Solved by the Invention

In the method disclosed in Patent Document 1, it is attempted to suppress rephosphorization after the desiliconization by controlling the slag composition so that a slag basicity is about 0.9~1.1 and T. Fe is about 15~20 mass % after the desiliconization. In this disclosed technique, however, there is a problem that the rephosphorization is caused when T. Fe is not more than 15 mass % at a slag basicity of 0.9~1.1 and hence phosphorus concentration in molten iron tapped becomes higher.

The method disclosed in Patent Document 2 is advantageous for decreasing phosphorus concentration of molten iron because tapping of molten iron from the converter type container and slag removal are carried out after the desiliconization and the desiliconized molten iron is again returned to the container to conduct dephosphorization. However, the tapping and charge of molten iron are repeated, so that there is a problem that the productivity is considerably deteriorated when these operations are carried out using the one (same) converter type container. On the other hand, two converter type containers may be used, but there is a problem that facility cost is high and heat loss due to heat dissipation from the container is increased. Also, there is a problem that since it is required to add a greater amount of flux solvent in the desiliconization and dephosphorization, the increase of refining cost is caused and heat loss due to heat absorption by the flux solvent is increased.

In the method disclosed in Patent Document 2, iron oxide such as iron ore or the like is charged in the dephosphorization for promoting slag formation or improving dephosphorization efficiency. Therefore, there is a problem that heat absorption associated with decomposition reaction of iron oxide or heat loss due to intermediate tapping is large and hence heat quantity enough to dissolve a greater amount of scrap cannot be ensured. In this method, since the basicity is relatively high, solid phase ratio in the slag becomes higher even at the end of the dephosphorization and the fluidity is poor and hence droplets of molten iron are incorporated into the slag and removed from the container and solidified without being separated. Consequently, there is a problem that the increase of base metal loss is caused. That is, a part of the base metal can be recovered as an iron source by magnetic separation after the pulverization of the slag, but iron particles incorporated in the slag cannot be recovered, and hence major part thereof is diverted to civil application and the like together with the slag and the loss of the base metal is large.

Patent Document 3 proposes a pretreatment method wherein the desiliconization and dephosphorization are continuously conducted in the one converter type container, while only 40~60 mass % of the slag is discharged after the dephosphorization and the remainder is used in the desiliconization and dephosphorization of next charge to decrease the amount of flux solvent used and the slag generation amount, so that the decrease of heat loss is expected. However, Patent Document 3 does not show the slag composition and preferable treating temperature range in the desiliconization and dephosphorization. Since the dephosphorization is conducted while retaining a great amount of the desiliconized slag in the container, it is required to use a great amount of a lime-based flux solvent for adjusting slag basicity in the production of low-phosphorus molten iron. Consequently, the desiliconized slag is not caused, whereas the amount of dephosphorized slag is increased in the container to lower the reaction efficiency and the amount of the dephosphorized slag discharged is inversely increased, so that there is a problem that the loss of base metal incorporated into the dephosphorized slag is caused.

A primary object of the invention is to propose a method for efficiently conducting desiliconization and dephosphorization of molten iron in a small amount of a flux solvent used. Another object of the invention is to propose a method for preliminary treatment of molten iron which is capable of suppressing the production cost of low-phosphorus molten iron, increasing the amount of scrap used and further reducing the loss of base metal incorporated into the slag.

Solution for Task

The inventors have made various studies on a method wherein phosphorus concentration can be decreased efficiently even when the amount of flux solvent used is suppressed in the process of desiliconization, dephosphorization and decarburization and heat source for dissolving scrap can be ensured sufficiently to improve iron yield. Consequently, it has been found that the above objects can be attained by properly adjusting the amount of slag retained in the converter and carried over to subsequent step and the treating conditions such as slag composition, temperature and the like in preliminary treatment conducting desiliconization and dephosphorization of molten iron, and as a result, the method for preliminary treatment of molten iron according to the invention has been accomplished.

That is, the invention is a method for preliminary treatment of molten iron by conducting desiliconization and dephosphorization of molten iron with a converter type container wherein molten iron tapped from a blast furnace is first charged into the converter type container to conduct desiliconization and then the molten iron and a part of a slag after the desiliconization are retained in the container to conduct intermediate slag removal and subsequently a lime-based flux solvent is added to the molten iron and slag retained in the container after the desiliconization while blowing oxygen to conduct dephosphorization of the molten iron, characterized in that not less than 30 mass % of a slag having a slag basicity of not less than 1.2 after the dephosphorization is retained in the converter type container, and then at least untreated molten iron is charged into the container containing the slag after the dephosphorization to conduct desiliconization, and silicon concentration of molten iron at the end of the desiliconization is made to not more than 0.2 mass % and a basicity of the slag after the desiliconization is made to not less than 0.5 but not more than 1.5 and a temperature of the molten iron is made to not lower than 1240° C. but not higher than 1400° C., and thereafter an intermediate slag removal of discharging not less than 40 mass % of the slag after the desiliconization from the container is conducted and subsequently dephosphorization is conducted in the same container.

In the invention are preferable the following solution means:

(1) the basicity of the slag after the dephosphorization is not more than 3.0;

(2) the slag after the dephosphorization is retained in the container at not less than 60 mass % of an amount generated in the dephosphorization;

(3) a basicity of the slag during the desiliconization is not less than 0.8 but not more than 1.5;

(4) the slag after the desiliconization has a slag basicity of not less than 0.8 but not more than 1.5 and T. Fe of not less than 5 mass % but not more than 25 mass %;

(5) cold iron source is charged during the desiliconization;

(6) the desiliconization is conducted by charging cold iron source into the converter type container in addition to the molten iron tapped from the blast furnace and blowing oxygen to render a temperature of the molten iron at the end of the desiliconization to not lower than 1260° C. but not higher than 1350° C.;

(7) an amount of cold iron source satisfying the following equation is charged in the desiliconization per a total amount of molten iron and the cold iron source charged in the converter type container:

$$Y=(3+34.5[\%\ Si]+0.21T_i)\cdot(1000-X_s)/1000$$

wherein Y is 230~270,
[% Si] is a silicon concentration in the molten iron charged (mass %),
$T_i$ is a temperature of the molten iron charged (° C.), and
$X_s$ is a basic unit of cold iron source (kg/t);

(8) silicon concentration of molten iron at the end of the desiliconization is not more than 0.1 mass %;

(9) the dephosphorization is conducted by charging or adding 100~250 kg/t of cold iron source and 2~10 kg/t of silicon as an oxide per total weight of molten iron and cold iron source into the converter type container;

(10) the dephosphorization is conducted by retaining 4~20 kg/t of a slag after the desiliconization per total weight of cold iron source and molten iron in the converter type container after the intermediate slag removal, adding a lime-based flux solvent and blowing oxygen so as to render a slag basicity after the dephosphorization into not less than 1.2 but not more than 3.0 and a temperature of the molten iron after the end of the dephosphorization into not lower than 1280° C. but not higher than 1360° C.;

(11) the dephosphorization is conducted by jetting a refining agent containing at least one ingredient of powdery lime, calcium carbonate and iron oxide toward molten metal through a top blowing lance.

Effect of the Invention (1) According to the method for preliminary treatment of molten iron according to the invention having the aforementioned construction, a lime content in the slag after the dephosphorization can be utilized as a lime source in the desiliconization of next charge and can suppress rephosphorization in the desiliconization, so that it is possible to decrease the amount of the lime-based flux solvent over a whole of the preliminary treatment process of the molten iron.

(2) According to the invention, the intermediate slag removal and subsequent dephosphorization are conducted in the same container after the desiliconization, so that an amount corresponding to heat dissipation due to displacement of refining container may be a heat source for dissolving cold iron source, while the high temperature slag generated from the pre-charge after the dephosphorization can be utilized as a flux solvent, and hence a content of heat absorbed can be utilized as a heat for dissolving cold iron source as compared to the case of adding flux solvent at a room temperature. As a result, it can be attempted not only to increase an amount of cold iron source (scrap) used but also to reduce the loss of base metal.

(3) According to the invention, the slag generated in the desiliconization having a low basicity is discharged from the container between the desiliconization and the dephosphorization, so that the amount of the lime-based flux solvent can be decreased in the dephosphorization necessary to be carried out at a relatively high basicity ((mass % CaO/mass % $SiO_2$)=1.2~3.0) and the production cost of molten iron can be suppressed.

EMBODIMENTS FOR CARRYING OUT THE INVENTION

The invention will be described with reference to the drawings below.

Figure 1:
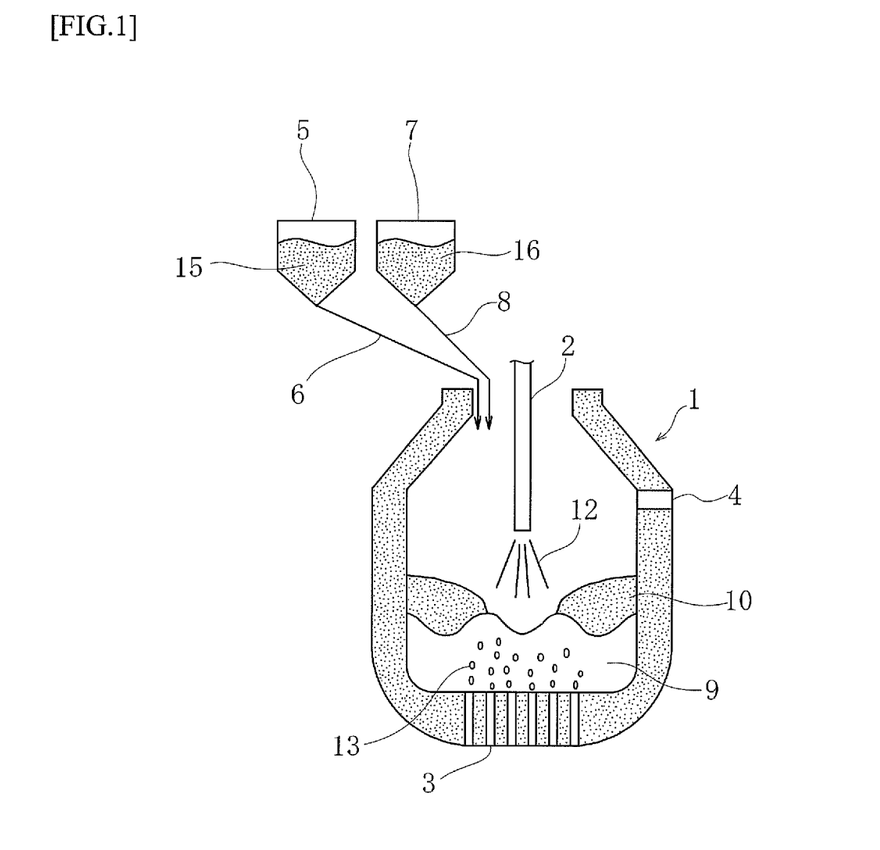
FIG. 1 is a schematic view of a converter type container (refining furnace) used in the method for preliminary treatment of molten iron according to the invention.

In the method for preliminary treatment of molten iron according to the invention, a top and bottom-blowable converter type refining furnace 1 as shown in FIG. 1 is used as an example of the converter type container. In the refining furnace 1, top blowing is carried out by blowing oxygen gas 12 from a tip of an elevating top-blowing lance 2 toward molten iron 9. As the oxygen gas 12 is used industrial pure oxygen. Also, bottom blowing is carried out with bottom blowing tuyeres 3 disposed in the bottom of the refining furnace 1. As a bottom blowing gas 13, a gas containing oxygen gas or an inert gas such as Ar gas, nitrogen gas or the like is common, but a gas having a function of strengthening agitation of molten iron 9 and promoting dissolution of cold iron source by blowing into the molten iron, or further a gas having a function of blowing a flux solvent into the molten iron together with a carrier gas may be used. Moreover, numeral 4 in the figure is a tapping port for tapping the molten iron 9 after the refining.

In the invention, two or more converter type refining furnaces 1 are used in the refining of the molten iron, in which at least one of the converter type refining furnaces 1 is used in the preliminary treatment of the molten iron according to the invention and the remaining one furnace is used in the decarburization refining of the molten iron subjected to the preliminary treatment of the molten iron by the application of the invention method. For example, it is preferable that the preliminary treatment is conducted in the converter type refining furnace 1 for the preliminary treatment of the molten iron and the molten iron after the preliminary treatment is displaced in the converter type refining furnace for decarburization refining to conduct the decarburization.

Figure 2:
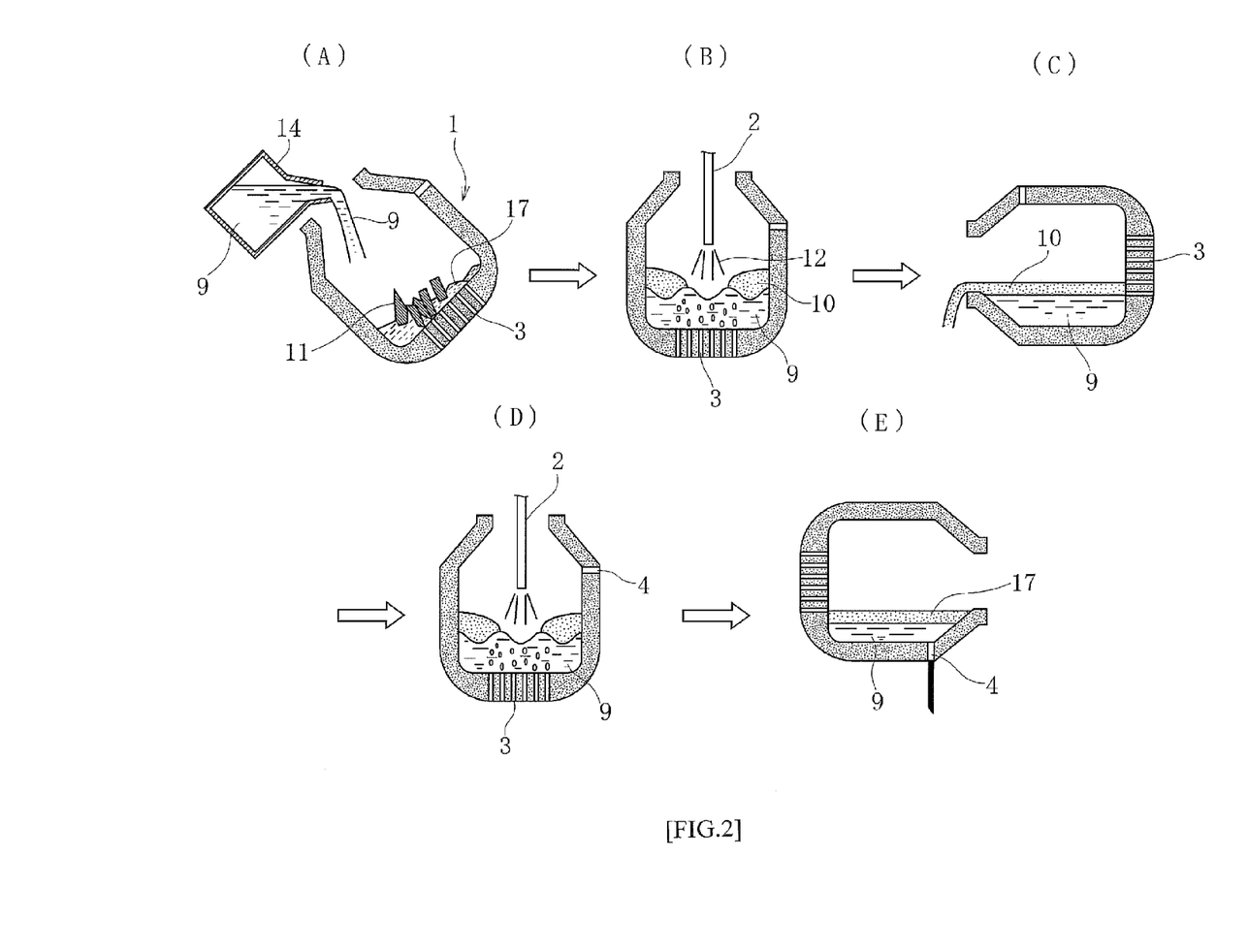
FIG. 2 is a schematic view illustrating the method for preliminary treatment of molten iron according to the invention in process sequence.

The method for preliminary treatment of molten iron according to the invention using the converter type refining furnace 1 is carried out in the order of (A) charging of molten iron, (B) desiliconization, (C) intermediate slag removal, (D) dephosphorization and (E) tapping of molten iron as shown in a flow chart of FIG. 2. Especially, it is possible to efficiently conduct the preliminary treatment of molten iron by repeating these steps in the same furnace.

(1) There will be first explained a step of charging molten iron (A).

At the step (A), a new molten iron 9 is charged from a charging ladle 14 while retaining a slag generated 17 after the dephosphorization by the preliminary treatment of the pre-charged molten iron (hereinafter referred to as "slag after dephosphorization" simply) in the converter type refining furnace 1, or cold iron source 11 such as iron scrap or the like is charged before the charging of molten iron and then the molten iron 9 is charged. As the previously charged cold iron source 11 may be ones composed mainly of iron such as direct-reduced iron, cold pig iron and the like in addition to the iron scrap defined in "Uniform standards of Ferrous Scraps" of The Japan ferrous raw materials association.

The slag 17 after the precedent dephosphorization retained in the refining furnace 1 for next refining is used for the purpose of adjusting slag basicity in the subsequent desiliconization. The slag basicity after the dephosphorization (mass % CaO/mass % $SiO_2$) (hereinafter referred to as "basicity" simply) is made to not less than 1.2, preferably not less than 1.4. Because, when the basicity of the slag 17 after the dephosphorization at the end of the precedent dephosphorization is less than 1.2, even if such a slag is retained, the adjustment of the basicity in the desiliconization is insufficient and it is required to add a great amount of lime-based flux solvent. Moreover, the upper limit of the slag basicity after the dephosphorization is not particularly limited, but the slag basicity in the usual dephosphorization of molten iron is not more than about 3.0, so that it is not necessary to increase the basicity so as to exceed the above value.

The amount of the slag 17 after the precedent dephosphorization retained in the furnace is necessary to be not less than 30 mass % of the slag amount generated in the precedent dephosphorization of molten iron, preferably not less than 60 mass % for effectively conducting the adjustment of the basicity. In the invention, when the full amount of the slag retained in the furnace after the tapping of molten iron through the dephosphorization is utilized in the new desiliconization of molten iron, the adjustment of the basicity becomes further effective in the desiliconization. Furthermore, when such a procedure is conducted continuously, the slag discharged by the preliminary treatment of molten iron becomes homogeneous because it is comprised of only the slag after the desiliconization and the slag after the dephosphorization having a high basicity is not incorporated thereinto, so that there is caused no problem such as swelling of slag due to hydration, elution of alkali or the like. Therefore, the method of the invention is very effective for attempting the utilization of the slag.

The slag after the dephosphorization has a relatively high basicity and is relatively low in the temperature (not higher than about 1350° C.), so that the fluidity is low. Therefore, even when the cold iron source is charged onto the slag after the dephosphorization, there is caused no delaying of dissolution due to the catching of the cold iron source with the slag, so that there is no need for inefficient operation in heat balance and mass balance such as addition of much cooling material for solidification as in a case that so-called decarburized slag is retained in the furnace. Also, the slag after the dephosphorization is rich in the solid phase and low in the fluidity because of the above properties, so that a great amount of fine metallic iron is contained in its structure. Therefore, the slag contains not less than about 10 mass % of metallic iron even after the pulverization and magnetic separation. Although the slag is discharged out of the system in the conventional technique, the slag after the dephosphorization can be carried to next charge according to the invention, so that there is also an effect that a greater part of metallic iron in the slag after the dephosphorization is recovered in the molten iron to reduce iron loss.

In the slag at the end of the desiliconization (hereinafter referred to as "slag after desiliconization"), the fluidity is relatively high, so that metallic iron content in the slag is easily coarsened. Therefore, there is little metallic iron content retained in the slag without being recovered after the pulverization and magnetic separation of the slag. Thus, the method of the invention can reduce the loss of iron into the slag over the whole of the preliminary treatment of molten iron.

(2) Then, there will be explained a desiliconization step (B) shown in FIG. 2(B).

The step (B) is a step of conducting desiliconization by vertically standing the converter type refining furnace 1 and supplying oxygen gas 12 to the molten iron 9 through a top-blowing lance 2. In this desiliconization, a silicon source 15 housed in a hopper 5 and a lime-based flux solvent 16 housed in a hopper 7 are charged into the converter type refining furnace 1 through a chute 6 and a chute 8, respectively, while carbonaceous material or silicon source as heat source, iron oxide as oxygen source or the like is also charged in a similar fashion. As the oxygen source for the desiliconization, it is preferable to use only the oxygen gas 12 without using iron oxide having large heat absorption from a viewpoint of dissolving a great amount of cold iron source 11.

In the desiliconization, silicon contained in the molten iron 9 or silicon included in the silicon source 15 and the cold iron source 11 and migrating into molten iron through dissolution is desiliconized by reacting with the oxygen source ($Si+O_2 \rightarrow SiO_2$), so that it serves to enhance the reaction efficiency in subsequent dephosphorization. During the desiliconization is generated oxidation heat and the temperature of the molten iron is raised by this oxidation heat to promote dissolution of the cold iron source 11 in the molten iron.

The composition of the slag at the desiliconization stage is determined by considering the amount of the slag 17 after the precedent dephosphorization previously retained in the furnace and an estimated value of its composition, and the amount of silicon dioxide generated in the above reaction.

Figure 4:
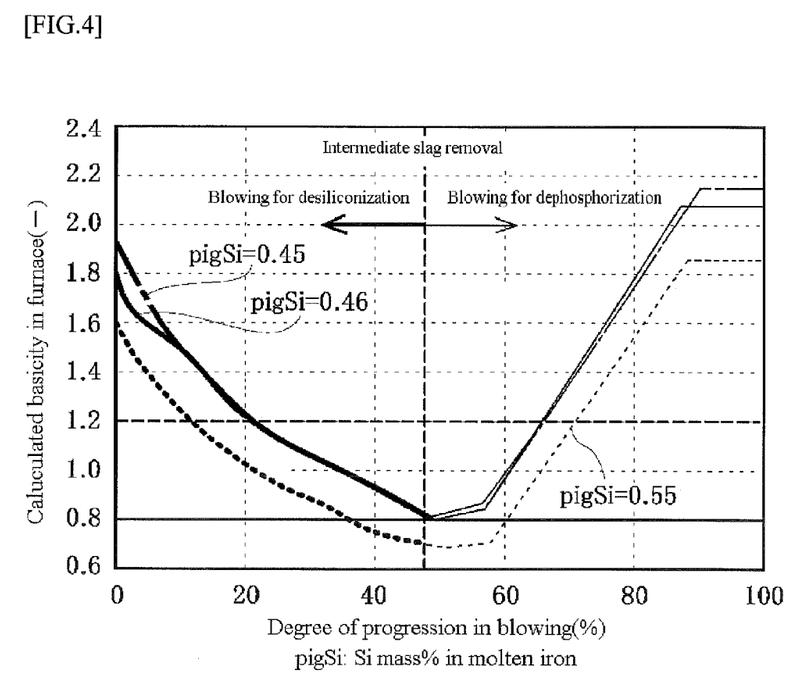
FIG. 4 is a graph showing a relation between a degree of progression in blowing and a calculated basicity in a container.

Namely, it is preferable to adjust the basicity of the slag during the desiliconization to not less than 0.8 but not more than 1.5. Because, when the slag basicity in the desiliconization is less than 0.8, the rephosphorization phenomenon due to the lowering of dephosphorization ability in the slag 17 after the dephosphorization is observed depending on the Si mass % of the molten iron as shown in FIG. 4. For example, FIG. 4 shows three patterns that Si in molten iron is 0.45 mass %, 0.46 mass % and 0.55 mass %. The phosphorus concentration before and after the desiliconization in the each pattern is dephosphorized from 0.121 mass % to 0.100 mass % in case of Si in molten iron of 0.45 mass % and from 0.122 mass % to 0.105 mass % in case of Si in molten iron of 0.46 mass % as seen from Examples 10~12 of Table 3. However, when Si in molten iron is 0.55 mass %, the phosphorus concentration is made from 0.120 mass % to 0.145 mass %. This is due to the fact that since the basicity in the desiliconization is less than 0.8, the phosphorus concentration after the desiliconization is increased to cause rephosphorization. On the other hand, when the slag basicity exceeds 1.5, the solid phase ratio rises due to the increase of non-slagged CaO and the fluidity of the slag 17 after the dephosphorization is deteriorated and there may be caused a case that the slag cannot be removed. The preferable upper limit is about 1.2.

Moreover, the calculated basicity in furnace (C/S) during the desiliconization shown in FIG. 4 is a calculated value based on the following equation (1). The equation (1) determines the basicity ($CaO/SiO_2$) from a numerical value obtained by adding a CaO amount contained in the dephosphorized slag retained in the furnace with a CaO amount generated in the respective charge up to a time T[s], and a numerical value obtained by adding a $SiO_2$ amount in the residual dephosphorized slag with a $SiO_2$ amount generated in the respective charge up to a time T[s]. Moreover, the CaO amount generated in the respective charge is a numerical value obtained by calculating and adding CaO amount (=CaO content in auxiliary material×residence time in furnace×dissolution rate) every auxiliary material charged.

Also, $SiO_2$ amount is a numerical value obtained by adding oxygen feeding rate×($SiO_2$ molecular weight)/(Si atomic weight)/(theoretical Si amount burnt by oxygen of 1 $Nm^3$)×oxygen efficiency of desiliconization up to a time T.

$$C/S_T[-] = \frac{CaO_A[kg] + CaO_B[kg]}{SiO_{2_A}[kg] + SiO_{2_B}[kg]} \quad (1)$$

$$CaO_A[kg] = Ws_A[kg] \times CaO\ \%_A[\%]/100$$

$$CaO_B[kg] = \sum CaO\ \%_a[\%] \times T_a[s] \times v_a[s/kg]/100$$

$$SiO_{2_A}[kg] = Ws_A \times SiO_2\%_A[\%]/100$$

$$SiO_{2_B}[kg] = \sum_0^T (VO)_2[Nm^3/s] \times 2.14/0.8[Nm^3/kg \cdot t] \times \eta_{Si}[-] \times Xs[t]$$

wherein $C/S_T[-]$: basicity calculated at a time T[s]
$CaO_A$ [kg]: CaO amount in slag retained in furnace
$CaO_B$ [kg]: CaO amount generated in respective charge up to a time T[s]
$SiO2_A$ [kg]: $SiO_2$ amount in slag retained in furnace
$SiO2_B$ [kg]: $SiO_2$ amount generated in respective charge up to a time T[s]
$Ws_A$ [kg]: amount of slag retained in furnace
$CaO\ \%_A$ [%]: CaO content in slag retained in furnace (mass %)
$SiO_2\%_A$ [%]: $SiO_2$ content in slag retained in furnace (mass %)
$CaO\ \%_a$ [%]: CaO content in auxiliary material a (mass %)

$T_a$ [s]: retention time of auxiliary material in a furnace
$v_a$ [s/kg]: dissolution rate of auxiliary material in a furnace
$VO_2$ [Nm³/s]: oxygen feeding rate in blowing
$\eta_{Si}$ [–]: oxygen efficiency for desiliconization in blowing
$X_s$ [ton/charge]: total of molten iron amount and scrap amount.

The above CaO %$_a$ is obtained by calculating calcined lime, calcium carbonate or CaO content in recycled slag. Also, molten iron or molten steel in the furnace is subjected to a batch type refining in the refining furnace such as converter type refining furnace or the like, where the refining of one unit is called as "charge".

Next, the slag basicity at the end of the desiliconization is adjusted to not less than 0.5 but not more than 1.5. When the basicity of the slag at this stage (slag after desiliconization) is less than 0.5, phosphorus is restored from the slag 17 after the precedent dephosphorization retained in the furnace to bring about the increase of phosphorus concentration in the molten iron and the burden of dephosphorization at subsequent step becomes large, which is inefficient. Therefore, the basicity of the slag after the desiliconization at the end of the desiliconization is not less than 0.5, preferably not less than 0.8. Also, when the slag basicity at this stage exceeds 1.5, the fluidity of the slag is lowered, so that there is a problem that the slag removal amount at the subsequent intermediate slag removal is less or the control of the slag removal amount is difficult, which is not efficient even in the reduction of the lime-based flux solvent. Therefore, the slag basicity after the desiliconization is not more than 1.5, preferably not more than 1.2. In the adjustment of the basicity, the lime-based flux solvent such as calcined lime, lime stone, dolomite or the like and steel-making slag selected from decarburized slag, dephosphorized slag and ladle slag are used as a flux solvent.

The temperature of the molten iron at the end of the desiliconization is adjusted to not lower than 1240° C. but not higher than 1400° C., preferably not lower than 1260° C. but not higher than 1350° C. When it exceeds 1400° C., the rephosphorization is caused from the dephosphorized slag retained in the furnace to bring about the increase of phosphorus concentration in the molten iron, so that not only the dephosphorization burden at subsequent step becomes large and is inefficient but also it is necessary to increase magnesia concentration in the slag for preventing damage of lined magnesia carbon bricks, which brings about the cost increase. While when it is lower than 1240° C., the fluidity of the slag is lowered, and not only there is a problem that the slag removal amount at the subsequent intermediate slag removal is less and the control of the slag removal amount is difficult and but also the dissolution rate of the scrap is decreased.

Also, it is necessary to control the temperature of the molten iron at this stage for efficiently conducting dephosphorization at subsequent dephosphorization step. For example, when the temperature of the molten iron at the end of the desiliconization is made to not higher than 1350° C., the amount of the cooling material such as iron ore or the like to be added for adjusting the temperature in the dephosphorization can be decreased drastically. Moreover, when the desiliconization and dephosphorization are continuously conducted in the same furnace, there may be a case that the charging of the scrap is difficult before the dephosphorization in view of the operation time. Also, the cold iron source capable of being charged from above the furnace during the treatment is expensive granulated source or base metal generated in iron mills and restricted quantitatively, so that it is difficult to be steadily used in a great amount. In fact, the cold iron source may not be charged from above the furnace due to the restriction on the kind of the auxiliary material capable of being used by the charging device above the furnace. Heretofore, the cooling material utilized in the dephosphorization step was limited to iron oxide such as iron ore or the like, so that it is common that cheap cold iron sources such as scrap and the like cannot be utilized sufficiently.

In general, it is relatively easy to increase the amount of cheap scrap used in the desiliconization step, so that the temperature of the molten iron after the desiliconization can be made to not higher than 1350° C. Thus, the amount of iron oxide used at the dephosphorization stage can be decreased significantly. As a result, a large amount of heat absorption due to the decomposition reaction of iron oxide can be decreased and the heat amount thereof can be sorted to the dissolution of the cold iron source in the desiliconization. Moreover, if the temperature is lowered after the desiliconization, there is a fear that the scrap is left undissolved, but the left scrap is kept in the furnace together with the molten iron and the dissolution can be promoted up to the subsequent dephosphorization stage. That is, when the cold iron source is dissolved up to the end of the dephosphorization, there is caused no problem in the operation.

As the temperature of the molten iron after the desiliconization may be used a value measured by a thermocouple or a value estimated from heat balance. For example, the estimation from heat balance can be conducted according to the following equation (2), but is not necessarily limited thereto. Because, coefficient is adjusted depending on respective apparatus condition or operation condition, and variable is added or removed. Moreover, if the scrap is left undissolved after the desiliconization, the measured value tends to be made somewhat higher than the estimated value but is error range and has no objection.

$$T = \{0.21T_i \cdot X_p - 42.9X_s + (4137+0.327T_i)X_{Si} - 746.6X_c - (575.5+0.025T_i)X_{ore} + (3239-0.115T_i)X_{O2} + 28.2X_f - 1638W^{-(1/3)}X_t\}/(0.21X_p + 0.179X_s + 0.535X_{Si} + 0.468X_c + 0.151X_{ore} + 0.115X_{O2} + 0.241X_f) \quad (2)$$

T: temperature of molten iron after desiliconization (° C.)
$T_i$: temperature of molten iron charged (° C.)
$X_p$: basic unit of molten iron (kg/t) (per 1 ton in total of molten iron weight and cold iron source weight, the same applies hereafter)
$X_s$: basic unit of cold iron source (kg/t)
$X_{Si}$: basic unit of silicon forming an oxide (kg/t) (total included in molten iron, cold iron source and additive)
$X_C$: basic unit of carbon in additive (kg/t)
$X_{ore}$: basic unit of iron oxide (kg/t)
$X_{O2}$: basic unit of gaseous oxygen (Nm³/t)
$X_f$: basic unit of flux solvent (kg/t)
W: volume of molten iron in converter (t)
$X_t$: time from tapping of precedent charge to end of desiliconization (minute)

Here, silicon forming an oxide is a total included in the molten iron, the cold iron source and the additive. As the silicon concentration in the molten iron among them is used a rapid analytical value of a sample taken out from the molten iron before the charging every charge. However, an alternative method may be used by carrying out an operation with other analytical value of ingredients tapped from the blast furnace. As the silicon concentration in various cold iron sources is used, for example, an analytical value of a typical sample every lot, but the concentration in the cold pig iron is equal to that in the molten iron and is frequently stable. Also, the silicon concentration in the scrap is varied depending on the source but is stable at a value of not more than about 1/10 of pig iron on average, which may be used as a typical value or may be negligible.

In the additive is existent silicon of no oxide as the silicon forming an oxide (silicon existing at an oxidizable state). This means iron silicide, metallic silicon, silicon carbide, silicon nitride or other silicide. As the typical additive may be mentioned ferrosilicon, briquette made of powder containing about 60 mass % of silicon carbide (hereinafter referred to as silicon carbide briquette) and so on.

As the method of analyzing silicon of no oxide in the additive is used an analysis method of ferrosilicon described in JIS G1312, but presumption may be conducted by using total silicon analysis, acid-soluble silicon analysis, total carbon analysis, total oxygen analysis, total nitrogen analysis, thermal mass analysis, carbon analysis through temperature hysteresis adjusted burning method, analysis of other elements included, analysis of compounds through X-ray diffractometry and the like in combination.

In addition, the additive contains carbon. As the carbon are used not only carbonaceous material such as coke, amorphous graphite or the like but also carbon in a carbide such as the aforementioned silicon carbide or the like. As the flux solvent are used auxiliary materials such as quicklime, light-calcined dolomite, magnesia linker and the like. Also, slag such as dephosphorized slag, decarburized slag, ladle slag and the like can be used as a calcium oxide source or a magnesium oxide source. As an example of the cheap auxiliary material may be utilized carboxide, hydroxide or the like of calcium or magnesium. However, since they are large in the heat absorption, if they are used in a great amount, it is desired to modify the above equation (2) while discriminating from other flux solvent.

In order to render the temperature of the molten iron after the desiliconization into the above range of 1240~1400° C. while attempting to increase the amount of the cold iron source used and suppress the refining cost, the basic unit of cold iron source $X_s$ (kg/t) per total weight (t) of cold iron source and molten iron is preferable to be made to a range of not less than 230 but not more than 270 as a value of Y calculated according to the following equation (3). When Y is less than 230, it is necessary that the carbonaceous material such as amorphous graphite or the like is added as a heat source to prolong the blowing time or calcium oxide source is added for adjusting the slag basicity while using a great amount of expensive heat source such as ferrosilicon or the like, and hence the increase of the refining cost or the lowering of the productivity is undesirably caused. While, when the value of Y in the equation (3) exceeds 270, the cooling material such as iron ore or the like is used for controlling the temperature, which is unfavorable from a viewpoint that the amount of the cold iron source used is made maximum.

$$Y=(3+34.5[\% Si]+0.21T_i) \cdot (1000-X_s)/1000 \quad (3)$$

Y:230~270

[% Si]: silicon concentration in molten iron charged (mass %)

$T_i$: temperature of molten iron charged (° C.)

$X_s$: basic unit of cold iron source (kg/t)

In the invention, the basic unit of the cold iron source is adjusted as mentioned above, but a proper amount of silicon having a large amount of heat generation may be used as a heat source for dissolving a great amount of the cold iron source for a short time. In this case, it is preferable that a total amount of silicon of no oxide added in the charging or in the desiliconization is a range of 2~10 kg/t, preferably a range of 4~8 kg/t per total weight of molten iron and cold iron source charged. In this connection, when silicon is added in an amount exceeding 10 kg/t, the amount of silicic acid generated in the desiliconization becomes excessive, and even if the desiliconization is carried out while a total volume of the slag is left in the furnace after the dephosphorization of the precedent charge, it is required to add a great amount of calcium oxide source for further adjusting the basicity and hence the amount of the slag in the furnace becomes large, which is not preferable from a viewpoint of the refining cost and the like. While, when the silicon amount is less than 2 kg/t, the amount of heat generation by oxidation reaction of silicon is small, which is not effective for the dissolution of the cold iron source. Furthermore, the amount of silicic acid generated is decreased at the desiliconization stage, and when a great amount of the dephosphorized slag having a high basicity is left in the furnace, the basicity after the desiliconization becomes high, which is an obstacle in the subsequent slag removal and hence it is undesirably required to adjust the basicity by adding a silicate source fruitless thermally or as a resource. In this connection, the silicon amount of 4~8 kg/t is said to be a preferable range for adjusting the basicity after the desiliconization or for ensuring heat source for the dissolution of the cold iron source.

As the silicon source to be added may be used ferrosilicon, but it is preferable to use a silicon carbide briquette composed mainly of cheaper silicon carbide or a waste refractory composed mainly of silicon carbide. Moreover, it is not necessary to use only this silicon source as a heat source, and other heat source such as carbonaceous material or the like may be co-used within a range not decreasing the productivity. The carbonaceous material is desirable to be added by forecasting decarburization amount so as to render carbon concentration in molten iron at the end of the desiliconization into not less than 3.3 mass %. When it is less than 3.3 mass %, the heat source is lacking in the subsequent dephosphorization and decarburization steps and also the carburizing speed on the surface of the cold iron source such as scrap or the like is lowered to bring about the lowering of the dissolution rate.

In the preferable desiliconization of the invention, the temperature of the molten iron after the desiliconization is controlled to a proper range, while silicon is utilized as a heat source, so that even when the cold iron source is used in a great amount of 100~250 kg/t per total weight of molten iron and cold iron source (t), the decrease of the productivity or increase of the refining cost is not caused and the dissolution of the cold iron source and the preliminary refining of the molten iron can be conducted efficiently. However, when the basic unit of the cold iron source exceeds 250 kg/t, there is a problem that further heat source is required to bring about the increase of the cost or the blowing time is prolonged to decrease the productivity. Also, the further increase of the use amount is not efficient in view of the restriction of the charging installation of the cold iron source.

Moreover, as mentioned later in detail, it is preferable to cause proper foaming in the slag inside the converter type refining furnace 1 in order to enhance the slag removing property of the slag 10 after the desiliconization. To this end, it is effective to enhance the rate of CO gas generated by the reaction between carbon in the molten iron and iron oxide in the slag. In order to stably obtain the slag removal ratio in the subsequent slag removing step, therefore, it is preferable to supply oxygen in an amount exceeding stoichiometric amount required for oxidizing silicon in the molten iron and in the silicon source added.

The basic unit of oxygen supplied to the molten iron during the desiliconization is preferable to be a sum of the stoichiometric amount required for desiliconization and not less than 2 $Nm^3/t$, desirably not less than 4 $Nm^3/t$. In the invention, the silicon concentration in the molten iron at the end of the desiliconization by the transmission of oxygen is not more than 0.2 mass %, preferably not more than 0.1 mass %, more preferably not more than 0.05 mass %. Thus, the slag removing property can be well kept while maintaining the foaming state even in the slag removal after the desiliconization and the rephosphorization from the slag to the molten iron can be suppressed. According to the inventors' studies, it has been confirmed that the above effects are obtained by blowing oxygen for the desiliconization with an oxygen supplying rate through top blowing of 1~2 $Nm^3/min \cdot t$ and a bottom gas blowing rate of about 0.02~0.2 $Nm^3/min \cdot t$.

Even when the desiliconization of the molten iron is conducted while the total volume of the dephosphorized slag in the precedent treatment is left in the furnace, lime content in the dephosphorized slag can be utilized effectively without causing the rephosphorization by combining the control of the silicon concentration with the control of the slag basicity and the control of the molten iron temperature. Also, the concentration of phosphoric acid in the slag can be enhanced by combining the controls of the silicon concentration, slag basicity and molten iron temperature and also retaining the dephosphorized slag at the precedent treatment in the furnace, whereby the foaming of the slag is promoted. Especially, phosphoric acid in the slag has an effect of decreasing the surface tension of the slag and promotes the reaction with molten iron or dispersion of fine bubbles, so that it is considered that even when (T. Fe) is a relatively low as iron oxide concentration of about 10 mass %, the foaming of the slag can be maintained to keep good slag removing property.

(3) Next, there will be explained an intermediate slag removing step (C) shown in FIG. 2(C).

In the method for the preliminary treatment of molten iron according to the invention, the slag removing step is placed after the above desiliconization step to conduct an intermediate slag removal of discharging the desiliconized slag with a low basicity containing a great amount of $SiO_2$ generated in the desiliconization from the converter type refining furnace 1. The intermediate removal of the desiliconized slag 10 is effective for decreasing the amount of lime-based flux solvent used for the adjustment of proper slag basicity in the subsequent dephosphorization step. Also, in case of the method for the preliminary treatment of molten iron according to the invention wherein the desiliconization of new molten iron is conducted while retaining a great amount of the dephosphorized slag generated by the preliminary treatment of the precedent molten iron in the furnace, the desiliconization is carried out so as to prevent the rephosphorization from the slag to the molten iron, so that the concentration of phosphoric acid in the desiliconized slag becomes higher than that of the conventional method. When a great amount of the desiliconized slag is retained in the furnace, the amount of phosphoric acid in the slag becomes excessive in the furnace at the subsequent dephosphorization step to lower the dephosphorization effect, so that the slag removal is important for preventing this problem.

In the method for the preliminary treatment of molten iron according to the invention, when the treatments of the above steps (A)~(E) are conducted repeatedly and continuously, if the discharge of the slag after the desiliconization is insufficient, storing of phosphoric acid in the furnace proceeds, so that it is required to take a care. Because, when the amount of phosphoric acid in the slag becomes too large in the furnace at the dephosphorization step, the dephosphorization efficiency is decreased by the increase of phosphoric acid concentration in the slag to increase the concentration of phosphorus in the molten iron after the treatment or to increase the amount of the lime-based flux solvent required for the dephosphorization reaction.

In the invention, therefore, it is preferable that the slag removal ratio of the desiliconized slag (mass %)=(slag discharged mass %)×100/(slag in the furnace at the end of desiliconization mass %) is at least not less than 40 mass %, desirably not less than 60 mass %. When the slag removal ratio is less than 40 mass %, the amount of the lime-based flux solvent used at the subsequent dephosphorization step is increased as previously mentioned. Also, as the slag amount is increased, the slag foaming cannot be suppressed, and hence the blowout of the slag is caused from the port of the furnace in the dephosphorization and operation troubles may be caused due to the slag blowout.

In the method for the preliminary treatment of the molten iron according to the invention, the basicity of the slag after the desiliconization is made to a range of 0.5~1.5, and the temperature of the molten iron at the end of the desiliconization is made to not lower than 1240° C. but not higher than 1400° C., and further the oxygen basic unit is properly adjusted to promote the slag foaming, whereby good slag fluidity and gas holdup can be ensured and the good slag removal can be conducted only by tilting the furnace body after the desiliconization to flow out the slag from the port of the furnace. When the slag is flown out by adjusting the tilting angle of the furnace body so as not to flow out the molten iron, it is obliged to retain a certain amount of the slag in the furnace, but the amount of the slag retained in the furnace can be controlled to be small because the volume ratio of the foaming slag is about 1/10 and the bulk specific gravity lowers as compared to the true specific gravity. Moreover, when the foaming of the slag is calmed, the decrease of the slag removal ratio is caused, so that a time from the end of the desiliconization to the start of tilting the furnace body for the slag removal is preferable to be within 4 minutes.

Figure 3:
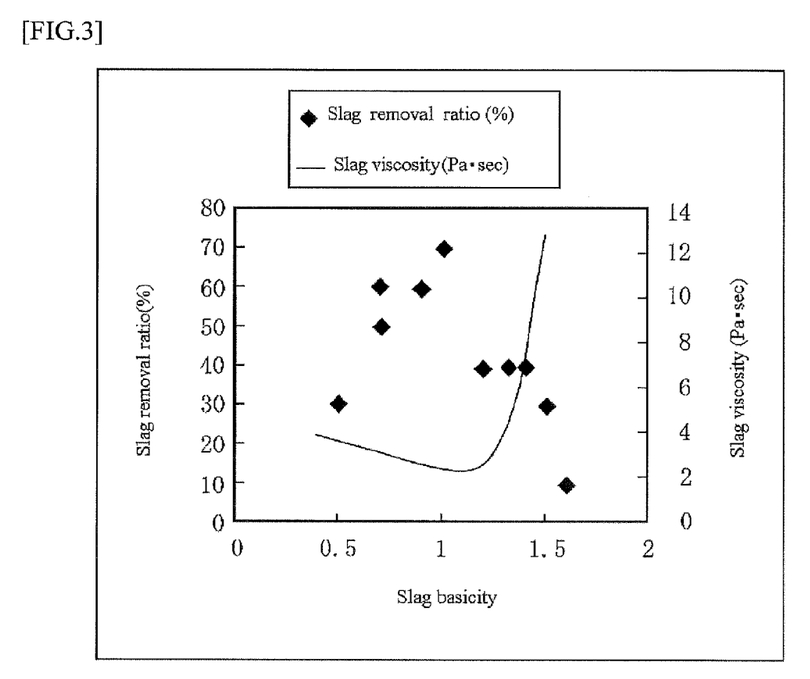
FIG. 3 is a graph showing a relation among slag basicity, slag removal ratio and slag viscosity.

When the basicity of the desiliconized slag required in the slag removing stage is less than 0.5, as shown in FIG. 3, the viscosity of the slag is increased and the good slag removal ratio cannot be ensured. While, when the basicity of the desiliconized slag exceeds 1.5, solid phase slag is generated to lower the fluidity of the slag and decrease the slag removal ratio. From a viewpoint of ensuring the slag removing property and slag removal ratio, the basicity of the slag is sufficient to be about 0.5~1.5. From a viewpoint of preventing the rephosphorization from the slag at the desiliconization step and decreasing the amount of the lime-based flux solvent used, it is more preferable to adjust the basicity of the slag to a range of 0.8~1.2.

Also, the slag foaming is promoted by fine CO bubbles generated by (T. Fe) in the desiliconized slag at the slag removing step, i.e., by the reaction of iron oxide and molten iron or granulated iron containing carbon suspending in the slag. As alternative confirmation is conducted in order to test the proper (T. Fe) concentration range, in case of (T. Fe)<5 mass %, the slag foaming is insufficient and driving force is small when the slag is discharged by tilting of the converter and sufficient discharge is difficult. On the other hand, in case of (T. Fe)>25 mass %, the generation of CO bubbles in the slag flowing proceeds drastically and bumping phenomenon is confirmed, and hence it is obliged to interrupt the slag removing operation. To this end, the proper range of (T. Fe) in the slag at the end of the desiliconization, or at the slag removing step is (T. Fe)=5~25 mass %.

When the temperature of the desiliconized slag is low (lower than 1260° C.) in the treatment at the slag removing step, the fluidity of the slag is lowered by the increase of the slag viscosity associated with the generation of solid phase slag and the increase of the viscosity of the liquid phase slag to thereby bring about the decrease of the slag removal ratio. Therefore, the basic unit of the cold iron source is adjusted and also at least one of addition amount of heat source such as silicon carbide, ferrosilicon or the like and basic unit of oxygen is adjusted depending on initial conditions of molten iron used, whereby the temperature of the molten iron at the end of the desiliconization is made to not lower than 1260° C. and the slag temperature is made to not lower than 1260° C.

When almost all of the slag generated after the desiliconization is removed, the slag formation of the lime-based flux solvent newly added at subsequent dephosphorization step is delayed, which is a factor of obstructing the dephosphorization. To this end, fluorite may be added to promote the slag formation. In this case, however, the use of the slag is subjected to restriction as previously mentioned, which obstructs the utilization of the slag. Also, there is a method of promoting the slag formation by adding iron oxide such as iron ore or the like. However, this method is not advisable because heat loss is large due to decomposition endothermic reaction of iron oxide and heat quantity usable for dissolution of cold iron source is decreased.

Therefore, in order to promote the slag formation of the lime-based flux solvent without using fluorite or iron oxide at the dephosphorization stage, it is also effective to retain a proper amount of the desiliconized slag having preferable composition and temperature in the furnace and utilize silicon dioxide or iron oxide in the slag for promoting the slag formation. In the discharge of the desiliconized slag, it is preferable that the tilting angle of the furnace body is adjusted while maintaining the preferable slag removal ratio of the desiliconized slag at not less than 40%, preferably not less than 60% so as to retain 4~20 kg/t of the desiliconized slag in the furnace. Thus, the dephosphorization reaction can be promoted efficiently without using iron oxide at the dephosphorization stage and it is possible to indirectly utilize heat quantity based on the decomposition endothermic reaction of iron oxide as heat for dissolution of the cold iron source at the desiliconization. When the retaining amount of the desiliconized slag is less than 4 kg/t, it is necessary to use iron oxide for promoting the slag formation of the lime-based flux solvent at the subsequent dephosphorization step. While when it exceeds 20 kg/t, there is a problem that the amount of the lime-based flux solvent used is increased or the dephosphorization operation is obstructed.

(4) The, there will be explained a dephosphorization step (D) shown in FIG. 2(D).

After the slag removing step (C), the dephosphorization of the molten iron is conducted by adding a lime-based flux solvent to the molten iron retained in the same converter type refining furnace 1 and blowing oxygen as an oxygen source. As the oxygen source used in this dephosphorization step, it is preferable to use only oxygen gas 12 from a top blowing lance 2 in view of reducing heat loss. Phosphorus in the molten iron is oxidized by oxygen in the supplied oxygen source to form phosphorus oxide ($P_2O_5$), and the phosphorus oxide is stably incorporated into the slag produced by the slag formation of the lime-based flux solvent to promote the dephosphorization of the molten iron. In order to efficiently promote the dephosphorization reaction, it is preferable that the dephosphorization is carried out by adding the lime-based flux solvent so as to render the basicity of the dephosphorized slag (slag 18 after dephosphorization of the latest charge) into not less than 1.2 but not more than 3.0 and supplying oxygen so as to render the temperature of the molten iron after the end of the dephosphorization into not lower than 1280° C. but not higher than 1360° C.

When the slag basicity of the dephosphorized slag 17 generated in this dephosphorization is less than 1.2 or the temperature of the molten iron exceeds 1360° C., the dephosphorization ability of the slag is deteriorated and phosphorus concentration in the molten iron after the treatment may not be decreased sufficiently. While, when the slag basicity exceeds 3.0, the slag formation of the lime-based flux solvent is difficult and the cost of the lime-based flux solvent increases. When the molten iron temperature is lower than 1280° C., the slag formation is also difficult and heat quantity in the subsequent decarburization step is lacking. In order to sufficiently ensure heat quantity in the decarburization stage, it is desired that the molten iron temperature after the dephosphorization is made to not lower than 1280° C. but not higher than 1360° C. and also the amount of oxygen used and/or the amount of carbon added in the desiliconization and the dephosphorization are/is adjusted so as to render the carbon concentration in the molten iron after the dephosphorization into not less than 2.8 mass %.

In the operation according to the invention method, there is caused a case that Si concentration, P concentration and temperature of the molten iron are varied to make the molten iron temperature after the desiliconization low, or a case that P concentration of the molten iron is high and the dephosphorization burden is large. In this case, in order to promote the dissolution of lime at the dephosphorization step, it is effective to blow lime source such as powdery lime, calcium carbonate or the like onto a molten iron surface from a top blowing lance with oxygen gas or inert gas. At a zone of the molten iron surface exposed to the top blowing oxygen is caused direct decarburization reaction or iron oxidation to make the temperature higher to about 2000° C., and hence fusion is promoted by adding the powdery lime to such a zone.

In the method for the preliminary treatment of the molten iron according to the invention, $SiO_2$ containing slag contributing to the fusion of the lime is discharged after the desiliconization, so that premature dissolution is effective by charging of the powdery lime. In this method, oxidation heat of Si in the molten iron is utilized to promote the dissolution of the cold iron source. Therefore, the operation at a higher temperature is preferable as regards the dissolution rate of the scrap in the molten iron. However, the higher temperature becomes rather inconvenient in the rephosphorization in the desiliconization and the dephosphorization. In the invention, therefore, top blowing of powdery iron oxide is simultaneously conducted at the zone exposed to the top blowing oxygen, and the only the reaction zone is locally cooled by the decomposition reaction of iron oxide (endothermic reaction), whereby it is made possible to attempt the dephosphorization or the suppression of rephosphorization under macroscopically higher temperature conditions. As the auxiliary material containing lime or calcium carbonate may be not only a single substance but also recycled materials such as slag generated in decarburization blowing in converter and the like. Also, as iron oxide may be used not only a single substance of iron ore or the like but also recycled materials such as rolling scale, sintered ore powder, collected dust and the like.

(5) Next, there will be explained a tapping step (E) shown in FIG. 2(E).

In this step (E), the molten iron in the converter type refining furnace is tapped to a container holding the molten iron (not shown) by tilting the converter type refining furnace 1 toward a side provided with a tapping port when phosphorus concentration in the molten iron through the above dephosphorization step is decreased to a given value. Moreover, the given value of the phosphorus concentration is preferable to be not more than 0.030 mass %.

As mentioned above, the method for the preliminary treatment of the molten iron according to the invention is a continuous treatment of tapping the molten iron after the dephosphorization, leaving at least a part of the dephosphorized slag in the furnace without discharging, and charging new molten iron to conduct desiliconization. Therefore, the most of the slag discharged from the converter type refining furnace (preliminary treating furnace) is a slag after the desiliconization, which can decrease the incorporation of the dephosphorized slag having a relatively high basicity. This avoids a case that if the dephosphorized slag is incorporated, there is feared alkali elution or swelling due to hydration reaction to restrict the use of the slag. Especially, such a problem is not quite caused in a method not discharging the dephosphorized slag, so that the treatment of the slag can be simplified and it is possible to use the slag to high-value added applications. Particularly, this has a large effect to a case that the preliminary treatment of the molten iron is continuously and repeatedly carried out with the one converter as in the invention.

EXAMPLES

The preliminary treatment of molten iron according to the invention is carried out with a converter type refining furnace 1 of 250 tons in capacity as shown in FIG. 1. In this treatment, oxygen gas is blown from a top blowing lance 2 toward a bath surface (molten iron), while nitrogen gas for agitation is blown into the molten iron through five bottom blowing tuyeres disposed in the bottom of the furnace body. In all Examples shown in Table 1 and a part of Comparative Examples shown in Table 2, a part or whole of a dephosphorized slag produced by dephosphorization of precedent molten iron is retained in the converter type refining furnace, and a cold iron source is first charged thereinto and then a molten iron is charged into the furnace, and thereafter oxygen is top-blown to start desiliconization. In a part of the operation, SiC briquettes and non-oxide Si are used as a silicon source for a heat source in the desiliconization, and quicklime is used as a lime-based flux solvent for adjusting a basicity and added to the furnace from above. After the end of the desiliconization, the furnace body is tilted immediately to conduct slag removal. Subsequently, quicklime and oxygen gas are supplied, and iron ore is added in a part of the operation to conduct dephosphorization. A time from the start of the desiliconization to the end of tapping after the dephosphorization is about 30 minutes.

As the cold iron source is used iron scrap defined in "Uniform standards of Ferrous Scraps" of The Japan ferrous raw materials association.

Operation conditions and operation results are shown in Table 1 as regards Invention Examples and in Table 2 as regards Comparative Examples, respectively. In any operations, iron oxide is not used in the desiliconization, but a basicity of a slag discharged from the converter type refining furnace at a slag removing step after the desiliconization is made to a target value except for Comparative Example 3, so that the slag is formed sufficiently.

TABLE 1

| | Item | Unit | Example 1 | Example 2 | Example 3 | Example 4 | Example 5 |
|---|---|---|---|---|---|---|---|
| Precedent dephosphorized slag | $CaO/SiO_2$ | Mass ratio | 1.5 | 1.2 | 1.8 | 1.8 | 1.5 |
| | Retention ratio | mass % | 100 | 100 | 33 | 63 | 100 |
| | Amount retained | kg/t | 25 | 28 | 8 | 15 | 25 |
| Charging | Amount of molten iron | kg/t | 875 | 840 | 880 | 880 | 896 |
| | Temperature of molten iron | °C. | 1280 | 1275 | 1290 | 1283 | 1295 |
| | [C] in molten iron | mass % | 4.6 | 4.6 | 4.6 | 4.6 | 4.6 |
| | [Si] in molten iron | mass % | 0.39 | 0.42 | 0.36 | 0.37 | 0.44 |
| | [P] in molten iron | mass % | 0.12 | 0.12 | 0.12 | 0.12 | 0.12 |
| | Amount of scrap | kg/t | 125 | 160 | 120 | 120 | 104 |
| Desiliconization | SiC briquttes | kg/t | 0 | 3.6 | 0 | 0 | 0 |
| | Non-oxide Si | kg/t | 3.4 | 5.1 | 3.2 | 3.3 | 4.0 |
| | Quicklime | kg/t | 0 | 0 | 1.2 | 0 | 0 |
| | Oxygen basic unit | $Nm^3/t$ | 8.0 | 10.0 | 8.0 | 8.0 | 8.0 |
| | Temperature at the end | °C. | 1271 | 1273 | 1281 | 1277 | 1320 |
| | C at the end | mass % | 3.5 | 3.4 | 3.5 | 3.5 | 3.7 |
| | Si at the end | mass % | 0.01 | 0.02 | 0.01 | 0.01 | 0.01 |
| | P at the end | mass % | 0.09 | 0.11 | 0.11 | 0.10 | 0.10 |
| | $CaO/SiO_2$ at the end | Mass ratio | 0.70 | 0.53 | 0.52 | 0.60 | 0.65 |
| | Amount of slag at the end | kg/t | 34 | 41 | 19 | 24 | 35 |
| Intermediate slag removal | Discharge ratio | mass % | 56 | 63 | 47 | 58 | 72 |
| | Amount retained | kg/t | 15.0 | 15.0 | 10.0 | 10.0 | 10.0 |
| Dephosphorization | Quicklime | kg/t | 5.4 | 6.3 | 6.1 | 6.5 | 7.0 |
| | Oxygen basic unit | $Nm^3/t$ | 6.0 | 6.0 | 6.0 | 6.0 | 6.0 |
| | Iron ore | kg/t | 0.0 | 0.0 | 0.0 | 0.0 | 5.0 |
| | Temperature at the end | °C. | 1332 | 1335 | 1339 | 1335 | 1359 |
| | C at the end | mass % | 3.0 | 2.9 | 3.0 | 3.0 | 3.0 |
| | P at the end | mass % | 0.020 | 0.027 | 0.027 | 0.022 | 0.022 |
| | $CaO/SiO_2$ at the end | mass % | 1.5 | 1.2 | 1.2 | 1.4 | 1.5 |
| | Amount of dephosphorized slag | kg/t | 25 | 30 | 24 | 24 | 25 |

TABLE 1-continued

|  |  |  |  |  |  |  |  |
|---|---|---|---|---|---|---|---|
|  | Y | — |  | 250 | 240 | 252 | 251 | 260 |
|  | Total quicklime | kg/t |  | 5.4 | 6.3 | 7.3 | 6.5 | 7.0 |

|  | Item | Unit | Example 6 | Example 7 | Example 8 | Example 9 |
|---|---|---|---|---|---|---|
| Precedent dephosphorized slag | CaO/SiO$_2$ | Mass ratio | 1.8 | 1.5 | 1.6 | 2.1 |
|  | Retention ratio | mass % | 100 | 100 | 100 | 100 |
|  | Amount retained | kg/t | 24 | 25 | 24 | 24 |
| Charging | Amount of molten iron | kg/t | 916 | 850 | 820 | 900 |
|  | Temperature of molten iron | °C. | 1296 | 1278 | 1263 | 1284 |
|  | [C] in molten iron | mass % | 4.6 | 4.6 | 4.6 | 4.6 |
|  | [Si] in molten iron | mass % | 0.45 | 0.42 | 0.86 | 0.26 |
|  | [P] in molten iron | mass % | 0.12 | 0.12 | 0.12 | 0.12 |
|  | Amount of scrap | kg/t | 84 | 150 | 180 | 100 |
| Desiliconization | SiC briquttes | kg/t | 0 | 3.6 | 0 | 0 |
|  | Non-oxide Si | kg/t | 4.1 | 5.1 | 7.1 | 2.4 |
|  | Quicklime | kg/t | 0 | 0 | 0 | 0 |
|  | Oxygen basic unit | Nm$^3$/t | 8.0 | 10.0 | 12.0 | 7.0 |
|  | Temperature at the end | °C. | 1346 | 1290 | 1292 | 1270 |
|  | C at the end | mass % | 3.8 | 3.4 | 3.3 | 3.6 |
|  | Si at the end | mass % | 0.02 | 0.02 | 0.10 | 0.01 |
|  | P at the end | mass % | 0.11 | 0.10 | 0.11 | 0.08 |
|  | CaO/SiO$_2$ at the end | Mass ratio | 0.72 | 0.57 | 0.50 | 1.07 |
|  | Amount of slag at the end | kg/t | 34 | 38 | 41 | 29 |
| Intermediate slag removal | Discharge ratio | mass % | 65 | 79 | 63 | 59 |
|  | Amount retained | kg/t | 12.0 | 8.0 | 15.0 | 12.0 |
| Dephosphorization | Quicklime | kg/t | 6.5 | 7.7 | 7.5 | 5.0 |
|  | Oxygen basic unit | Nm$^3$/t | 6.0 | 6.0 | 6.0 | 6.0 |
|  | Iron ore | kg/t | 8.0 | 0.0 | 4.0 | 0.0 |
|  | Temperature at the end | °C. | 1380 | 1349 | 1354 | 1332 |
|  | C at the end | mass % | 3.1 | 2.9 | 2.8 | 3.1 |
|  | P at the end | mass % | 0.021 | 0.018 | 0.028 | 0.019 |
|  | CaO/SiO$_2$ at the end | mass % | 1.8 | 1.5 | 1.2 | 1.5 |
|  | Amount of dephosphorized slag | kg/t | 24 | 25 | 31 | 24 |
|  | Y | — | 266 | 243 | 244 | 253 |
|  | Total quicklime | kg/t | 6.5 | 7.7 | 7.5 | 5.0 |

TABLE 2

|  | Item | Unit | Comparative Example 1 | Comparative Example 2 | Comparative Example 3 | Comparative Example 4 | Comparative Example 5 |
|---|---|---|---|---|---|---|---|
| Precedent dephosphorized slag | CaO/SiO$_2$ | Mass ratio | 1.5 | 1.1 | 1.1 | 1.2 | 1.2 |
|  | Retention ratio | mass % | 0 | 50 | 65 | 70 | 62 |
|  | Amount retained | kg/t | 0 | 34 | 26 | 28 | 30 |
| Charging | Amount of molten iron | kg/t | 925 | 850 | 895 | 910 | 875 |
|  | Temperature of molten iron | °C. | 1280 | 1280 | 1280 | 1320 | 1280 |
|  | [C] in molten iron | mass % | 4.6 | 4.6 | 4.6 | 4.6 | 4.6 |
|  | [Si] in molten iron | mass % | 0.40 | 0.40 | 0.40 | 0.50 | 0.40 |
|  | [P] in molten iron | mass % | 0.12 | 0.12 | 0.12 | 0.12 | 0.12 |
|  | Amount of scrap | kg/t | 75 | 150 | 105 | 90 | 125 |
| Desiliconization | SiC briquttes | kg/t | 3.6 | 3.6 | 3.6 | 0 | 3.6 |
|  | Non-oxide Si | kg/t | 5.2 | 4.9 | 5.1 | 4.6 | 5.0 |
|  | Quicklime | kg/t | 8.0 | 0 | 0 | 0 | 0 |
|  | Oxygen basic unit | Nm$^3$/t | 7.5 | 10.0 | 10.0 | 9.0 | 7.0 |
|  | Temperature at the end | °C. | 1348 | 1290 | 1350 | 1405 | 1265 |
|  | C at the end | mass % | 3.9 | 3.5 | 3.6 | 3.7 | 3.7 |
|  | Si at the end | mass % | 0.15 | 0.02 | 0.01 | 0.01 | 0.13 |
|  | P at the end | mass % | 0.11 | 0.11 | 0.14 | 0.13 | 0.12 |
|  | CaO/SiO$_2$ at the end | Mass ratio | 1.0 | 0.55 | 0.47 | 0.55 | 0.62 |
|  | Amount of slag at the end | kg/t | 23 | 49 | 40 | 40 | 40 |
| Intermediate slag removal | Discharge ratio | mass % | 100 | 0 | 62 | 62 | 32 |
|  | Amount retained | kg/t | 0 | 49 | 15 | 15 | 27 |
| Dephosphorization | Quicklime | kg/t | 9 | 11.6 | 10.3 | 10.5 | 9.8 |
|  | Oxygen basic unit | Nm$^3$/t | 6.0 | 6.0 | 6.0 | 6.0 | 7.0 |
|  | Iron ore | kg/t | 15.0 | 0.0 | 12.0 | 12.0 | 0.0 |
|  | Temperature at the end | °C. | 1350 | 1356 | 1357 | 1391 | 1358 |
|  | C at the end | mass % | 3.2 | 2.9 | 2.9 | 2.9 | 3.1 |
|  | P at the end | mass % | 0.020 | 0.030 | 0.030 | 0.031 | 0.029 |
|  | CaO/SiO$_2$ at the end | mass % | 1.5 | 1.1 | 1.1 | 1.2 | 1.2 |
|  | Amount of dephosphorized slag | kg/t | 23 | 68 | 40 | 40 | 48 |

TABLE 2-continued

| Item | Unit | Comparative Example 1 | Comparative Example 2 | Comparative Example 3 | Comparative Example 4 | Comparative Example 5 |
|---|---|---|---|---|---|---|
| Y | — | 264 | 243 | 256 | 271 | 250 |
| Total quicklime | kg/t | 17.0 | 11.6 | 10.3 | 10.5 | 9.8 |

Examples 1, 2 and 5~9 are a case that preliminary treatment of next molten iron is conducted while a whole amount of dephosphorized slag after the dephosphorization of precedent molten iron is retained in the furnace, and Comparative Example 1 is a case that a whole amount of slag is discharged after the dephosphorization of precedent molten iron for comparison. Also, Comparative Example 2 is a case that the dephosphorization is continuously conducted without discharging the desiliconized slag after the desiliconization.

In Examples 1~9 adapted to the invention method, conditions such as basicity and retaining amount in furnace (retention ratio and discharge ratio) of each of dephosphorized slag and desiliconized slag, temperature after desiliconization, silicon concentration in molten iron and so on are variously changed. In any conditions, the phosphorus concentration in the molten iron after the dephosphorization is as low as less than about 0.03 mass % at a small quicklime amount of about 5~7.7 kg/t used, and an amount of scrap is large as compared to Comparative Example 1. On the contrary, Comparative Example 1 discharges the whole amounts of the slag after the dephosphorization of the precedent molten iron and the desiliconized slag, so that the phosphorus concentration in the molten iron after the treatment is low, but the amount of quicklime used is increased and a great amount of iron ore is required for the slag formation in the dephosphorization, and hence the amount of scrap used is small.

In Comparative Example 2, the dephosphorization is conducted without discharging the slag after the desiliconization, so that the amount of the slag after the dephosphorization is significantly increased, and the amount of quicklime used is also increased. In Comparative Example 3, the slag basicity after the desiliconization lowers to less than 0.5, which is considered to bring about the rephosphorization, and also the amount of quicklime used becomes larger for adjusting the basicity in the dephosphorization. In Comparative Example 4, the temperature after the desiliconization becomes higher than 1380° C., which is considered to bring about the rephosphorization, and also the amount of quicklime used becomes larger for adjusting the basicity in the dephosphorization. In Comparative Example 5, the desiliconization is ended while desiliconization reaction does not proceed sufficiently, so that the slag foaming is easily calmed and the discharge ratio of the desiliconized slag becomes poor and the amount of quicklime used becomes larger.

In order to make clear the difference of treating conditions on the slag removing property, the slag removal is not conducted after the desiliconization, and the slag removing test is carried out by tilting the furnace after the desiliconization+dephosphorization. Considering Si concentration in the molten iron, the basicity ($CaO/SiO_2$) is adjusted to 1.5 after the desiliconization+dephosphorization, and as a result, (T. Fe) is 10-30 mass %, [Si] after the treatment is Tr., [P] is 0.050~0.070 mass %, and the temperature of the molten iron is 1340~1360° C. The slag foaming is not caused substantially, and the slag having a high solid phase ratio is discharged, and it is difficult to control the discharge amount by titling of the furnace. That is, the slag behavior and foaming condition are different in the discharge of the slag after the desiliconization and after the desiliconization+dephosphorization, so that the proper conditions of the slag composition cannot be applied.

From the comparison between Example 1 and Comparative Example 4, it can be seen that the dephosphorization can be conducted efficiently by increasing the amount of scrap used and lowering the temperature after the desiliconization to decrease the amount of quicklime used while suppressing the rephosphorization from the slag.

The influence of the basicity during the desiliconization is examined in the same way as the test of Tables 1 and 2. The results are shown in Table 3. As seen from Table 3, in Examples 11 and 12 satisfying the basicity during the desiliconization of 0.8~1.5, the rephosphorization is not caused and the phosphorus concentration after the dephosphorization is good. On the contrary, in Example 10 wherein the basicity during the desiliconization is outside of 0.8~1.5, the rephosphorization is caused and the phosphorus concentration after the dephosphorization becomes somewhat high.

TABLE 3

| Item | | Unit | Example 10 | Example 11 | Example 12 |
|---|---|---|---|---|---|
| Precedent dephosphorized slag | $CaO/SiO_2$ | Mass ratio | 1.6 | 1.8 | 1.9 |
| | Retention ratio | mass % | 100 | 100 | 100 |
| | Amount retained | kg/t | 30 | 33 | 28 |
| Charging | Amount of molten iron | kg/t | 877 | 879 | 875 |
| | Temperature of molten iron | ° C. | 1250 | 1,239 | 1,286 |
| | [C] in molten iron | mass % | 4.51 | 4.46 | 4.59 |
| | [Si] in molten iron | mass % | 0.55 | 0.46 | 0.45 |
| | [P] in molten iron | mass % | 0.120 | 0.122 | 0.121 |
| | Amount of scrap | kg/t | 123 | 121 | 125 |
| Desiliconization | SiC briquttes | kg/t | 0.0 | 0.0 | 0.0 |
| | Non-oxide Si | kg/t | 0.0 | 0.0 | 0.0 |
| | Quicklime | kg/t | 1.0 | 1.6 | 1.1 |
| | Oxygen basic unit | $Nm^3/t$ | 7.8 | 8.0 | 7.9 |
| | Lower limit of $CaO/SiO_2$ during blowing | Mass ratio | 0.68 | 0.82 | 0.85 |

TABLE 3-continued

| Item | | Unit | Example 10 | Example 11 | Example 12 |
|---|---|---|---|---|---|
| | Upper limit of CaO/SiO$_2$ during blowing | Mass ratio | 1.00 | 1.18 | 1.45 |
| | Temperature at the end | °C. | 1300 | 1275 | 1305 |
| | C at the end | mass % | 3.85 | 3.78 | 3.87 |
| | Si at the end | mass % | 0.04 | 0.01 | 0.02 |
| | P at the end | mass % | 0.145 | 0.105 | 0.100 |
| | CaO/SiO$_2$ at the end | Mass ratio | 0.70 | 0.82 | 0.90 |
| | (% T.Fe) at the end | mass % | 12.3 | 16.4 | 17.8 |
| | Amount of slag at the end | kg/t | 44.3 | 48.8 | 51.9 |
| Intermediate slag removal | Discharge ratio | mass % | 58 | 60 | 65 |
| | Amount retained | kg/t | 19 | 20 | 18 |
| Dephosphorization | Quicklime(top addition) | kg/t | 0.0 | 0.0 | 0.0 |
| | Quicklime(throwing) | kg/t | 6.4 | 6.4 | 6.3 |
| | Calcium carbonate(throwing) | kg/t | 0.0 | 0.0 | 0.0 |
| | Iron oxide(throwing) | kg/t | 0.0 | 0.0 | 0.0 |
| | Oxygen basic unit | Nm$^3$/t | 7.5 | 8.0 | 8.5 |
| | Iron ore(top addition) | kg/t | 0.0 | 0.0 | 4.0 |
| | Temperature at the end | °C. | 1383 | 1,360 | 1,353 |
| | C at the end | mass % | 2.62 | 2.88 | 2.99 |
| | P at the end | mass % | 0.027 | 0.020 | 0.018 |
| | CaO/SiO$_2$ at the end | Mass ratio | 1.73 | 2.05 | 2.11 |
| | Amount of dephosphorized slag | kg/t | 35 | 32 | 31 |
| | Y | — | 249 | 245 | 252 |
| | Total quicklime | kg/t | 7.4 | 8.1 | 7.4 |

Calculation formula: $\dfrac{CaOa[kg/t] + CaOb[kg/t]}{SiO_{2a}[kg/t] + SiO_{2b}[kg/t]}$ The above calclulation formula is used in the calculation of CaO/SiO$_2$ during blowing for desiliconization.
CaOa: dissolution amount of lime charged
CaOb: CaO in retained slag
SiO$_{2a}$: Si amount burnt × 2.14
SiO$_{2b}$: retained slag SiO$_2$ Also, the influence of T. Fe at the end of the desiliconization on the time of intermediate slag removal is examined as the tests of Tables 1 and 2. The results are shown in Table 4. As seen from Examples 13~16 in Table 4, a greater amount of scrap can be used in all examples and the amount of quicklime used can be decreased. Particularly, in Examples 13 and 14 supplying powdery quicklime, calcium carbonate and iron oxide from the top blowing lance at the dephosphorization step, the slag formation/fusion rate of quicklime increase and the phosphorus concentration after the treatment at the same amount of quicklime is as low as [P]<0.020 mass %. In the method of Examples 13 and 14 wherein (T. Fe) in the desiliconized slag at the slag removing step is 5~25 mass %, the time of intermediate slag removal can be shortened and the intermediate slag removing property is good. On the contrary, Example 15 is low in (T. Fe) in the desiliconized slag at the slag removing step and takes a long time of intermediate slag removal as compared to Examples 13 and 14. On the other hand, Example 16 is high in (T. Fe) in the desiliconized slag at the slag removing step and causes bumping phenomenon, so that it takes time to calm the slag and the slag removing time is increased.

TABLE 4

| | Item | Unit | Example 13 | Example 14 | Example 15 | Example 16 |
|---|---|---|---|---|---|---|
| Precedent dephosphorized slag | CaO/SiO$_2$ | Mass ratio | 1.9 | 1.8 | 1.2 | 1.2 |
| | Retention ratio | mass % | 100 | 100 | 100 | 100 |
| | Amount retained | kg/t | 25 | 24 | 27 | 28 |
| Charging | Amount of molten iron | kg/t | 900 | 900 | 900 | 900 |
| | Temperature of molten iron | °C. | 1250 | 1300 | 1300 | 1300 |
| | [C] in molten iron | mass % | 4.6 | 4.6 | 4.6 | 4.6 |
| | [Si] in molten iron | mass % | 0.45 | 0.45 | 0.45 | 0.45 |
| | [P] in molten iron | mass % | 0.12 | 0.12 | 0.12 | 0.12 |
| | Amount of scrap | kg/t | 100 | 100 | 100 | 100 |
| Desiliconization | SiC briquttes | kg/t | 3.6 | 3.6 | 3.6 | 3.6 |
| | Non-oxide Si | kg/t | 5.0 | 5.0 | 5.0 | 5.0 |
| | Quicklime | kg/t | 0 | 0 | 0 | 0 |
| | Oxygen basic unit | Nm$^3$/t | 7.0 | 7.0 | 6.3 | 12.0 |
| | Temperature at the end | °C. | 1270 | 1320 | 1295 | 1390 |
| | C at the end | mass % | 3.9 | 3.8 | 3.9 | 3.4 |
| | Si at the end | mass % | 0.05 | 0.05 | 0.13 | 0.01 |

TABLE 4-continued

| | Item | Unit | Example 13 | Example 14 | Example 15 | Example 16 |
|---|---|---|---|---|---|---|
| | P at the end | mass % | 0.12 | 0.12 | 0.13 | 0.12 |
| | CaO/SiO$_2$ at the end | Mass ratio | 1.10 | 1.20 | 1.0 | 1.0 |
| | (% T•Fe) at the end | mass % | 15 | 14 | 3 | 28 |
| | Amount of slag at the end | kg/t | 30 | 30 | 30 | 35 |
| Intermediate slag removal | Discharge ratio | mass % | 75 | 77 | 76 | 72 |
| | Amount retained | kg/t | 7.5 | 6.9 | 7.2 | 9 |
| | Slag removing time | minutes | 6.0 | 6.0 | 10 | 15 |
| Dephosphorization | Quicklime (top addition) | kg/t | 0 | 0 | 8.0 | 6.5 |
| | Quicklime (throwing) | kg/t | 4 | 4 | 0 | 0 |
| | Calcium carbonate (throwing) | kg/t | 6 | 6 | 0 | 0 |
| | Iron oxide (throwing) | kg/t | 0 | 5 | 0 | 0 |
| | Oxygen basic unit | Nm$^3$/t | 6 | 6 | 7.7 | 3.0 |
| | Iron ore (top addition) | kg/t | 5 | 5 | 0 | 0 |
| | Temperature at the end | ° C. | 1330 | 1360 | 1390 | 1385 |
| | C at the end | mass % | 3.3 | 3.2 | 3.1 | 3.1 |
| | P at the end | mass % | 0.012 | 0.013 | 0.038 | 0.033 |
| | CaO/SiO$_2$ at the end | mass % | 1.5 | 1.7 | 1.6 | 1.5 |
| | Amount of dephosphorized slag | kg/t | 25 | 25 | 26 | 25 |
| | Y | — | 253 | 262 | 262 | 262 |
| | Total quicklime | kg/t | 7.0 | 7.0 | 8.0 | 6.5 |

INDUSTRIAL APPLICABILITY

The preliminary treatment of the molten iron according to the invention can decrease phosphorus concentration efficiently while suppressing the amount of flux used and the amount of slag generated, and can conduct dissolution of cold iron source such as iron scrap, cold molten iron or the like efficiently. This technique is applicable to the treatment with not only the converter type refining furnace but also the other refining container having the similar construction.

DESCRIPTION OF REFERENCE SYMBOLS 1 converter type refining furnace
2 top blowing lance
3 bottom blowing tuyere
4 tapping port
5 hopper
6, 8 chute
7 hopper
9 molten iron
10 slag after desiliconization
11 cold iron source
12 oxygen gas
13 bottom blowing gas
14 charging ladle
15 silicon source
15 lime-based flux solvent
17 slag after dephosphorization

The invention claimed is:

1. A method for preliminary treatment of molten iron by conducting desiliconization and dephosphorization of molten iron with a converter container, the method comprising:

charging untreated molten iron tapped from a blast furnace into the converter container to conduct a first desiliconization;

then retaining the molten iron and a part of a slag after the first desiliconization in the converter container to conduct intermediate slag removal;

subsequently adding a lime-based flux solvent to the molten iron and slag retained in the converter container after the first desiliconization while blowing oxygen to conduct a first dephosphorization of the molten iron, not less than 30 mass % of a slag having a slag basicity of not less than 1.2 after the first dephosphorization is retained in the converter container, then charging more untreated molten iron into the converter container containing the slag after the first dephosphorization to conduct a second desiliconization, and adjusting a basicity of the slag during the second desiliconization such that the basicity is in the range of 0.8 to 1.5, silicon concentration of molten iron at the end of the second desiliconization is not more than 0.2 mass %, a basicity of the slag after the second desiliconization is in the range of 0.5 to 1.5 and a temperature of the molten iron is in the range of 1240° C. to 1400° C.;

thereafter conducting a second intermediate slag removal of discharging not less than 40 mass % of the slag after the second desiliconization from the converter container; and subsequently conducting a second dephosphorization in the converter container, wherein the basicity of the slag during the second desiliconization is obtained by dividing a numerical value obtained by adding an amount of CaO contained in the slag after the first dephosphorization with a CaO amount generated, with a numerical value obtained by adding a SiO$_2$ amount in a residual dephosphorized slag with a SiO$_2$ amount generated, the CaO amount generated is calculated by multiplying (i) a CaO content in an auxiliary material, (ii) a retention time of the auxiliary material in a furnace, and (iii) a dissolution rate of the auxiliary material in the furnace, and the SiO$_2$ amount generated is calculated by multiplying (i) an oxygen feeding rate in blowing, (ii) the molecular weight of SiO$_2$ divided by the atomic weight of Si and further divided by a theoretical Si amount burnt by oxygen of 1 Nm$^3$, (iii) an oxygen efficiency for desiliconization in blowing, and (iv) a total amount of molten iron and scrap.

2. The method for preliminary treatment of molten iron according to claim 1, wherein the basicity of the slag after the first dephosphorization is not more than 3.0.

3. The method for preliminary treatment of molten iron according to claim 1, wherein the slag after the first dephosphorization is retained in the converter container at not less than 60 mass % of an amount generated in the dephosphorization.

4. The method for preliminary treatment of molten iron according to claim 1, wherein the slag after the second desiliconization has a slag basicity in the range of 0.8 to 1.5 and T. Fe in the range of 5 mass % to 25 mass %.

5. The method for preliminary treatment of molten iron according to claim 1, wherein cold iron source is charged during the second desiliconization.

6. The method for preliminary treatment of molten iron according to claim 1, wherein the second desiliconization is conducted by charging cold iron source into the converter container in addition to the molten iron tapped from the blast furnace and blowing oxygen to render a temperature of the molten iron at the end of the desiliconization to be in the range of 1260° C. to 1350° C.

7. The method for preliminary treatment of molten iron according to claim 1, wherein an amount of cold iron source satisfying the following equation is charged in the second desiliconization per a total amount of molten iron charged in the converter container and the cold iron source:

$$Y=(3+34.5[\%Si]+0.21\ T_i)\cdot(1000-X_s)/1000$$

where Y is 230~270, [%Si] is a silicon concentration by mass % in the molten iron charged, $T_i$ is a temperature ° C. of the molten iron charged, and $X_s$ is a basic unit kg/t of cold iron source.

8. The method for preliminary treatment of molten iron according to claim 1, wherein silicon concentration of molten iron at the end of the second desiliconization is not more than 0.1 mass %.

9. The method for preliminary treatment of molten iron according to claim 1, wherein the second desiliconization is conducted by charging or adding 100~250 kg/t of cold iron source per total weight of molten iron and cold iron source and 2~10 kg/t of iron silicide, metallic silicon, silicon carbide or silicon nitride as an oxidizable silicon into the converter container.

10. The method for preliminary treatment of molten iron according to claim 1, wherein the second dephosphorization is conducted by retaining 4~20kg/t of a slag after the second desiliconization per total weight of cold iron source and molten iron in the converter container after the intermediate slag removal, adding a lime-based flux solvent and blowing oxygen so as to render a basicity of the slag after the second dephosphorization to be in the range of 1.2 to 3.0 and a temperature of the molten iron after the end of the second dephosphorization to be in the range of 1280° C. to 1360° C.

11. The method for preliminary treatment of molten iron according to claim 1, wherein the dephosphorizations are conducted by jetting a refining agent containing at least one ingredient of powdery lime, calcium carbonate and iron oxide toward molten iron through a top blowing lance.

* * * * *